(12) United States Patent
Chen et al.

(10) Patent No.: US 11,550,475 B2
(45) Date of Patent: Jan. 10, 2023

(54) LIFE CYCLE MANAGEMENT SUCCESS RATE

(71) Applicant: Dell Products L.P., Round Rock, TX (US)

(72) Inventors: Jun Chen, Shanghai (CN); Jim Lewei Ji, Shanghai (CN); Bo Wang, Shanghai (CN); Xiang Huang, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/915,453

(22) Filed: Jun. 29, 2020

(65) Prior Publication Data
US 2021/0382626 A1    Dec. 9, 2021

(30) Foreign Application Priority Data
Jun. 3, 2020    (CN) .......................... 202010494303.9

(51) Int. Cl.
*G06F 3/06* (2006.01)

(52) U.S. Cl.
CPC ............ *G06F 3/0607* (2013.01); *G06F 3/067* (2013.01); *G06F 3/0619* (2013.01); *G06F 3/0649* (2013.01); *G06F 3/0653* (2013.01)

(58) Field of Classification Search
CPC .... G06F 3/0613; G06F 3/0658; G06F 3/0659; G06F 3/0689; G06F 11/3409; G06F 11/0757; G06F 11/0793; G06F 11/14; G06F 11/2035; G06F 11/2048; G06F 11/2064; G06F 11/2089; G06F 11/3027; G06F 11/3034; G06F 11/3055; G06F 11/34; G06F 11/3433; G06F 2201/84; G06F 3/0619; G06F 3/062; G06F 3/0649; G06F 3/065; G06F 3/0685; G06F 16/958
See application file for complete search history.

(56) References Cited

U.S. PATENT DOCUMENTS

2017/0180135 A1*  6/2017  Hodroj ................ H04L 9/0825
2020/0210272 A1*  7/2020  Zhang ..................... G06F 12/08

\* cited by examiner

*Primary Examiner* — Yong J Choe
(74) *Attorney, Agent, or Firm* — Jackson Walker L.L.P.

(57) ABSTRACT

An information handling system may include at least one processor; and a non-transitory memory coupled to the at least one processor. The information handling system may be configured to: receive health information for a plurality of node information handling systems; determine, based on the received health information, a score for each of the plurality of node information handling systems; determine an upgrade ordering for the plurality of node information handling systems based on the respective scores for the plurality of node information handling systems; and cause the node information handling systems to perform an upgrade procedure according to the upgrade ordering.

20 Claims, 2 Drawing Sheets

LIFE CYCLE MANAGEMENT SUCCESS RATE

TECHNICAL FIELD

The present disclosure relates in general to information handling systems, and more particularly to improving the success rate of life cycle management events in a cluster environment such as a hyperconverged infrastructure (HCI) cluster.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As used herein, the term life cycle management (LCM) refers to an approach for upgrading components within a cluster of information handling systems (e.g., containing some number 2 to N of individual node systems). Such clusters may comprise hyperconverged infrastructure (HCI) clusters in some embodiments. In these and other embodiments, individual nodes may be geographically distributed elements of a networked architecture.

During an LCM event, typically each node of a cluster may be upgraded in turn, with upgrade components such as firmwares, drivers, application software, etc. until the entire cluster reaches the same system version. In some embodiments, a single bundle package may be used to upgrade an entire cluster appliance as a whole.

Due to differences between nodes in a cluster (e.g., the health state of each node, the workload, hardware endurance, etc.), complex consequences may result for LCM procedure performance. For example, some nodes may successfully update without issue, while some may fail to update until after some technical support intervention. Such interventions require additional time and money, and so improving the success rate of LCM procedures is important.

In some clusters, a failure tolerance setting may be available to determine how many nodes may fail before the cluster enters a degraded state. Typically, many users may specify FT=1, such that if even one host fails, the cluster enters a degraded state. Such a setting would cause the LCM event to stop after the first host fails.

There is currently no fixed or predefined sequence to determine the order in which nodes are upgraded. Further, with FT=1, the LCM event may be stopped by the first node which fails to upgrade in the queue. The success rate of an LCM event may be calculated by the ratio of upgraded nodes/total number of nodes. For example, the failure rate is 100% if the LCM event fails and stops at the first node, while the success rate might approach (or exceed) 99% if it fails only at the last node. Accordingly, the success rate may be improved by optimizing the order in which nodes are upgraded.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with lifecycle management may be reduced or eliminated.

In accordance with embodiments of the present disclosure, an information handling system may include at least one processor; and a non-transitory memory coupled to the at least one processor. The information handling system may be configured to: receive health information for a plurality of node information handling systems; determine, based on the received health information, a score for each of the plurality of node information handling systems; determine an upgrade ordering for the plurality of node information handling systems based on the respective scores for the plurality of node information handling systems; and cause the node information handling systems to perform an upgrade procedure according to the upgrade ordering.

In accordance with these and other embodiments of the present disclosure, a method may include an information handling system receiving health information for a plurality of node information handling systems; the information handling system determining, based on the received health information, a score for each of the plurality of node information handling systems; the information handling system determining an upgrade ordering for the plurality of node information handling systems based on the respective scores for the plurality of node information handling systems; and the information handling system causing the node information handling systems to perform an upgrade procedure according to the upgrade ordering.

In accordance with these and other embodiments of the present disclosure, an article of manufacture may include a non-transitory, computer-readable medium having computer-executable code thereon that is executable by a processor of an information handling system for: receiving health information for a plurality of node information handling systems; determining, based on the received health information, a score for each of the plurality of node information handling systems; determining an upgrade ordering for the plurality of node information handling systems based on the respective scores for the plurality of node information handling systems; and causing the node information handling systems to perform an upgrade procedure according to the upgrade ordering.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
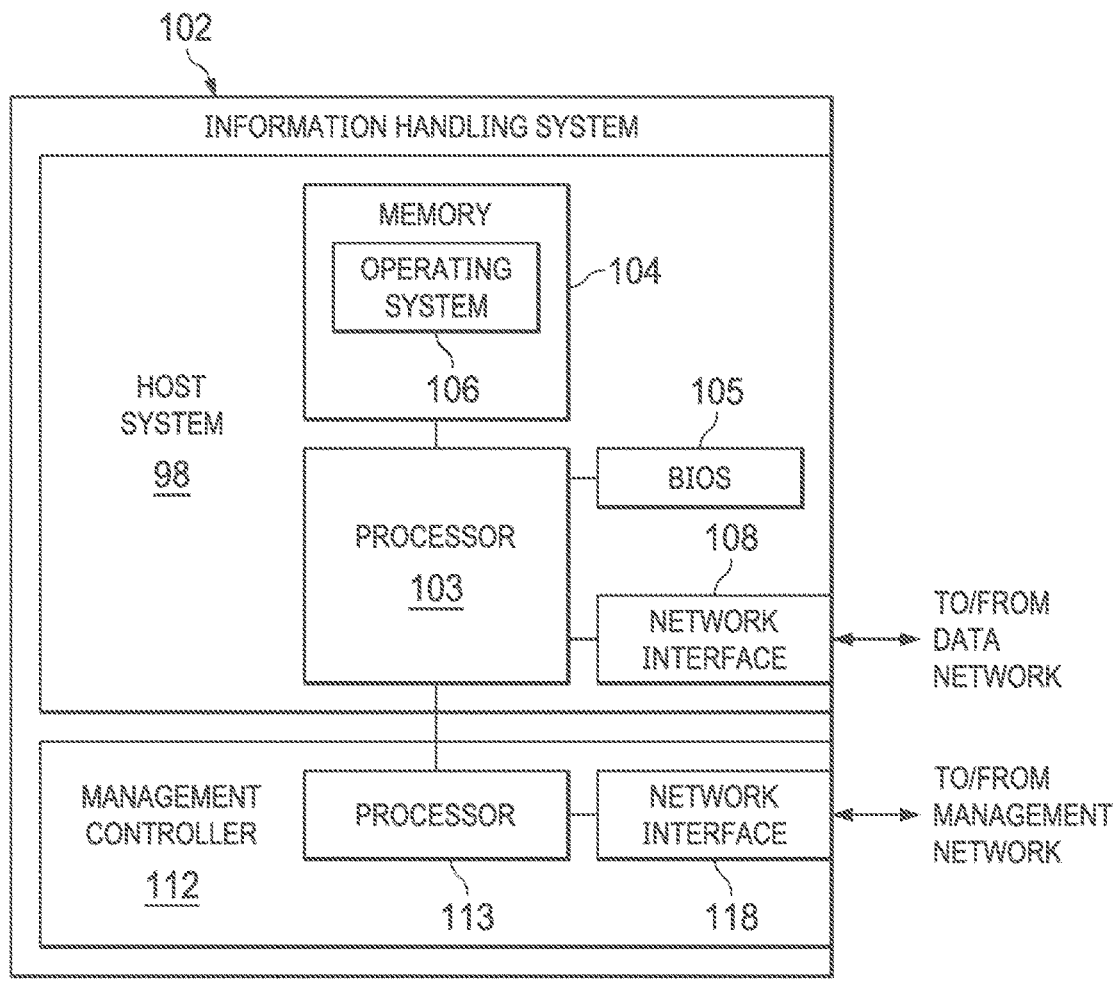
FIG. 1 illustrates a block diagram of an example information handling system, in accordance with embodiments of the present disclosure.
Figure 2:
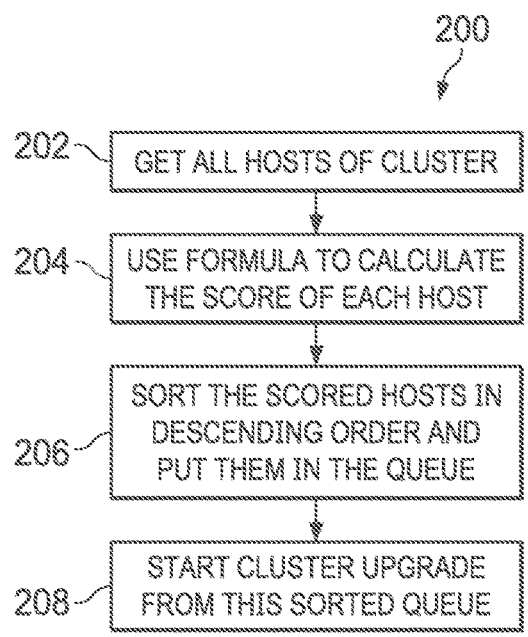
FIG. 2 illustrates an example method, in accordance with embodiments of the present disclosure.
Figure 3:
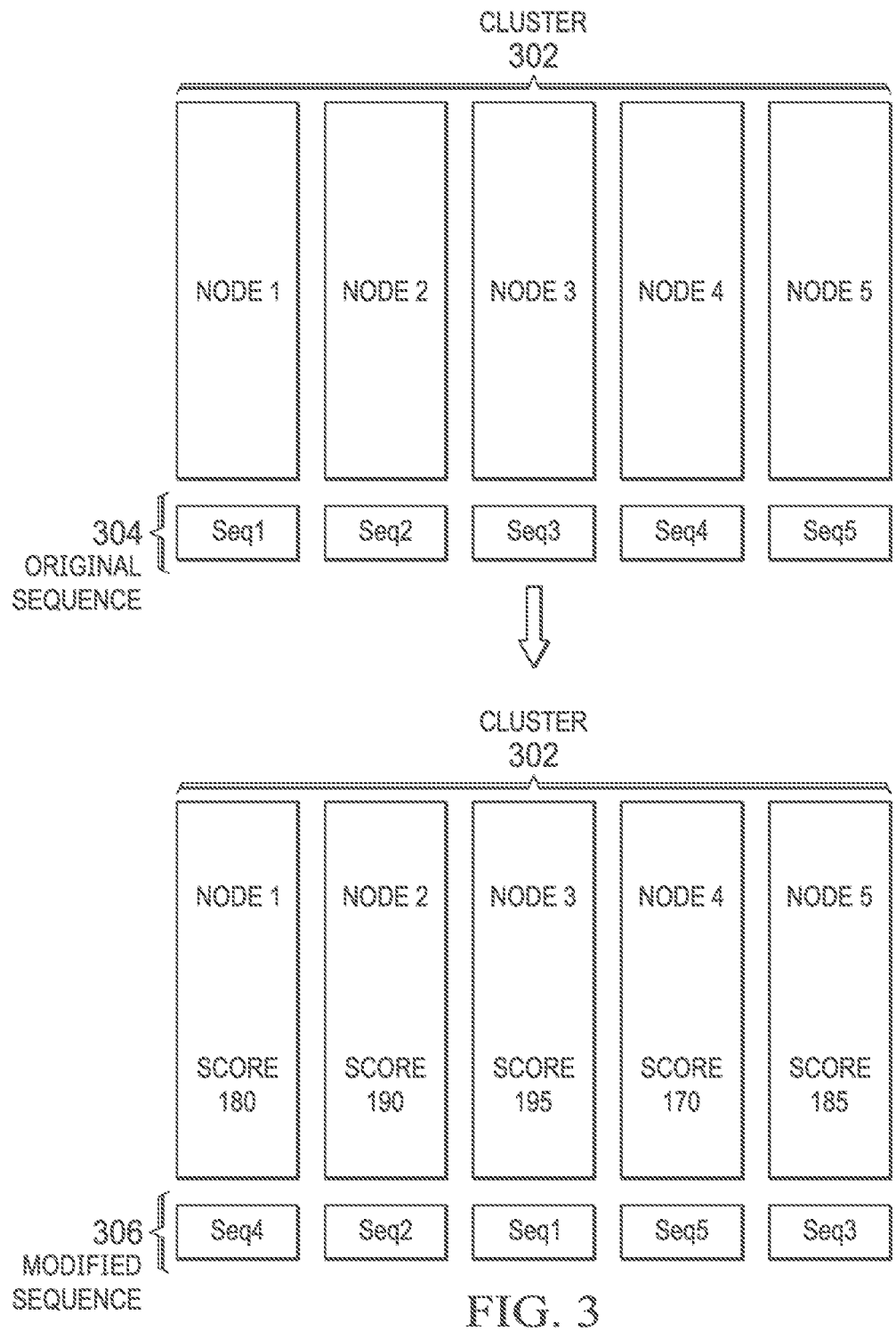
FIG. 3 illustrates a schematic diagram of modifying a lifecycle management sequence, in accordance with embodiments of the present disclosure.

Preferred embodiments and their advantages are best understood by reference to FIGS. 1 through 3, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, optimizing the order in which nodes of a cluster are upgraded during LCM events may provide significant benefits. Accordingly, embodiments of this disclosure may take into account various factors that may affect the likelihood of success, such that the nodes that are most likely to succeed are processed first, and the nodes that are most likely to fail are processed later. For example, an algorithm may be used to forecast the likelihood of success of individual hosts being upgraded, as well as to sort the hosts into an upgrade order that improves the overall success rate of a single upgrade attempt.

In some embodiments, nodes may be ordered based on a node score, which may be calculated based on factors falling into different tiers, which may be assigned different weights to reflect their relative importance in determining the likelihood of node success.

For example, in one embodiment, a first tier may be indicative of whether or not a node has errors reported in an event monitoring system. A second tier may be indicative of hardware components (e.g., CPU, memory, hard drive usage percentage, etc.). A third tier may be indicative of network bandwidth. A fourth tier may be indicative of a node's age. A fifth tier may be indicative of input from some third-party tool. A sixth tier may be indicative of the manufacturer, the system type, etc. Table 1 below provides one example of an embodiment of different tiers and their relative weights. In this example, high scores are indicative of a high likelihood of success. One of ordinary skill in the art with the benefit of this disclosure will appreciate that different scoring techniques may be used in some embodiments (e.g., in which low scores indicate a high likelihood of success, etc.).

TABLE 1

Weighted Score Metric

| Factor | Score | Weight Factor | Comments |
| --- | --- | --- | --- |
| Tier 1: No error state report in event system | 100 points | 1 | Node in a 'green' healthy state, success rate is potentially high |
| Tier 2: CPU, memory, hard drive | 100% > x > 80%: 30 points<br>80% > x > 50%: 50 points<br>X < 50%: 100 points<br>The minimum score of the three factors may be taken as the overall score for this tier | 0.6 | LCM requires much significant CPU, memory, and disk space to execute, so this ensures sufficient computing power |
| Tier 3: Network bandwidth | X < T1 speed: 20 points<br>x > T1 speed: 100 points | 0.5 | This is due to data and control path exchange between a controller and each node. If bandwidth is not sufficient, the upgrade might fail based on timeouts or packet loss |
| Tier 4: Node age | >3 years since production: 20 points<br><3 years since production: 100 pints | 0.5 | 3 years is typical industry tech refresh or warranty of a hardware vendor |
| Tier 5: 3$^{rd}$ party input metric | Depends on metric baseline | 1 | Vendor input |
| Tier 6: Brand and machine type, upgrade firmware list | Low end server: 20 points<br>Mainstream server: 60 points<br>High end server: 100 points | 0.8 | Server quality is an important metric, which means more stable platforms tend to have less issues |

The various scores from each tier may then be combined according to their weightings. For example, a formula such as the following may be used to determine the overall score for a node:

$$\text{Node Score} = \sum_{i=1}^{n} S_i W_i$$

where i denotes each tier (such that n=6 in the example of Table 1), $S_i$ is the score for the tier, and $W_i$ is the weight factor for the tier.

In some embodiments, the data that goes into the node score may be collected and/or calculated by a central controller that is communicatively coupled to all of the nodes of the cluster. Such a central controller may itself be one of the nodes of the cluster, or it may be a separate system. The data may be reported via management controllers of the nodes, via a software agent, etc., in various embodiments.

After a node score is calculated for each node, the nodes may be ordered such that nodes with higher scores are processed earlier in the LCM upgrade process. (In the case of a tie between two or more nodes, the order of those nodes may be selected randomly or in any other suitable fashion.) The nodes may then undergo the LCM upgrade process in turn, and the overall success rate may be increased because nodes having a high likelihood of success are processed first, and the upgrade process may be forced to stop after the first failure. (In other embodiments, a larger failure tolerance setting may be in effect, such that the process continues until two failures have been encountered, or three failures have been encountered, etc.)

Turning now to FIG. 2, a flow chart is shown of an example method 200 for increasing LCM success rate. At step 202, data may be collected to determine all of the hosts in a cluster. This data may be stored in a list or any other suitable data structure.

At step 204, a formula may be used to calculate a score for each host of the cluster. For example, a formula such as the one described above may be used in some embodiments. In other embodiments, different formulas and/or different tiers of score factors may be used.

At step 206, the hosts may be sorted into descending order based on the scores and placed into an upgrade queue. Accordingly, the hosts with the highest likelihood of upgrade success may be placed at the beginning of the upgrade queue.

At step 208, the cluster upgrade process may proceed, upgrading the hosts in the order of the queue established at step 206. The upgrade process may proceed until completion or until too many failure events have occurred.

One of ordinary skill in the art with the benefit of this disclosure will understand that the preferred initialization point for the method depicted in FIG. 2 and the order of the steps comprising that method may depend on the implementation chosen. In these and other embodiments, this method may be implemented as hardware, firmware, software, applications, functions, libraries, or other instructions. Further, although FIG. 2 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the method.

Turning now to FIG. 3, an example is shown of a cluster 302 in which an LCM upgrade process is to take place. In the original sequence 304, the nodes are to be upgraded in numerical order. In general, the original sequence 304 is not based on any particular information about success likelihood and may be considered essentially random.

In the modified sequence 306, the nodes of the cluster have been evaluated for likelihood of success and reordered based on their scores. Thus node 3, which has the highest score, has sequence number 1 in modified sequence 306. Node 2, which has the second highest score, has sequence number 2, etc.

Consider the situation in which node 1 will not upgrade successfully. In the original sequence 304, this would cause the entire process to fail with a 0% success rate (because the process would stop when the first failure was encountered). In the modified sequence 306, the process would achieve a 60% success rate, because nodes 3, 2, and 5 would have already been upgraded before the failure was encountered in node 1.

Thus embodiments of this disclosure may improve the success rate of a single upgrade attempt. In existing systems, nodes are essentially randomly selected, which means that the process could fail at first node, giving rise to a 0% success rate. With embodiments of this disclosure, the highest scored node may be in a very good state for the LCM upgrade process, because it is the most "healthy" node in the cluster. The success rate could then be significantly increased (for example, a success rate of 99% might be achieved if only the last one of 100 nodes in a cluster configuration were to fail).

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor; and
   a non-transitory memory coupled to the at least one processor;
   wherein the information handling system is configured to:
   receive health information for a plurality of node information handling systems;
   determine, based on the received health information, a score for each of the plurality of node information handling systems;
   determine an upgrade ordering for the plurality of node information handling systems based on the respective scores for the plurality of node information handling systems, wherein the upgrade ordering ranks each of the plurality of node information handling systems in a determined sequence; and
   cause the node information handling systems to perform an upgrade procedure according to the upgrade ordering, wherein the upgrade procedure includes upgrading at least one firmware and/or software component of the node information handling systems to a new version thereof.

2. The information handling system of claim 1, wherein the upgrade ordering is configured to order the node information handling systems in order from a highest likelihood of upgrade success to a lowest likelihood of upgrade success.

3. The information handling system of claim 1, wherein the health information includes information in a plurality of tiers.

4. The information handling system of claim 3, wherein the plurality of tiers have corresponding weight factors, such that the score for each node information handling system is based on a weighted sum of the information in the plurality of tiers weighted according to the weight factors.

5. The information handling system of claim 1, wherein the health information for a particular node information handling system includes a determination of whether or not the particular node information handling system has an error reported in an event monitoring system.

6. The information handling system of claim 1, wherein the health information for a particular node information handling system includes a determination of hardware information handling resources of the particular node information handling system.

7. The information handling system of claim 1, wherein the health information for a particular node information handling system includes a determination of a network bandwidth of the particular node information handling system.

8. A method comprising:
   an information handling system receiving health information for a plurality of node information handling systems;
   the information handling system determining, based on the received health information, a score for each of the plurality of node information handling systems;
   the information handling system determining an upgrade ordering for the plurality of node information handling systems based on the respective scores for the plurality of node information handling systems, wherein the upgrade ordering ranks each of the plurality of node information handling systems in a determined sequence; and
   the information handling system causing the node information handling systems to perform an upgrade procedure according to the upgrade ordering, wherein the upgrade procedure includes upgrading at least one firmware and/or software component of the node information handling systems to a new version thereof.

9. The method of claim 8, wherein the information handling system is one of the plurality of node information handling systems.

10. The method of claim 8, wherein the upgrade ordering is configured to order the node information handling systems in order from a highest likelihood of upgrade success to a lowest likelihood of upgrade success.

11. The method of claim 8, wherein the scores are determined as weighted sums of a plurality of respective scores within different tiers.

12. The method of claim 11, wherein each tier is indicative of a particular type of reliability indicator for the node information handling systems.

13. The method of claim 12, wherein the tiers include at least one tier selected from the group consisting of: presence of error reports in an event logging system, hardware resources, network bandwidth, node age, third-party input, and manufacturer identity.

14. An article of manufacture comprising a non-transitory, computer-readable medium having computer-executable code thereon that is executable by a processor of an information handling system for:
   receiving health information for a plurality of node information handling systems;
   determining, based on the received health information, a score for each of the plurality of node information handling systems;
   determining an upgrade ordering for the plurality of node information handling systems based on the respective scores for the plurality of node information handling systems, wherein the upgrade ordering ranks each of the plurality of node information handling systems in a determined sequence; and
   causing the node information handling systems to perform an upgrade procedure according to the upgrade ordering, wherein the upgrade procedure includes upgrading at least one firmware and/or software component of the node information handling systems to a new version thereof.

15. The article of claim 14, wherein the upgrade ordering is configured to order the node information handling systems in order from a highest likelihood of upgrade success to a lowest likelihood of upgrade success.

16. The article of claim 14, wherein the health information includes information in a plurality of tiers.

17. The article of claim 16, wherein the plurality of tiers have corresponding weight factors, such that the score for each node information handling system is based on a weighted sum of the information in the plurality of tiers weighted according to the weight factors.

18. The article of claim 14, wherein the health information for a particular node information handling system includes a determination of an age of the particular node information handling system.

19. The article of claim 14, wherein the health information for a particular node information handling system includes a determination of a third-party input for the health of the particular node information handling system.

20. The article of claim 14, wherein the health information for a particular node information handling system includes a determination of a manufacturer and model of the particular information handling system.

\* \* \* \* \*